US011724335B2

(12) United States Patent
Diwinsky et al.

(10) Patent No.: US 11,724,335 B2
(45) Date of Patent: Aug. 15, 2023

(54) SYSTEM AND METHOD FOR AUTOMATED LASER ABLATION

(71) Applicant: General Electric Company, Schenectady, NY (US)

(72) Inventors: David Scott Diwinsky, West Chester, OH (US); Michael Dean Fullington, West Chester, OH (US); Herbert Chidsey Roberts, Evendale, OH (US); Jacob Cole Hay, Circleville, OH (US); Stanley Louis Ream, Columbus, OH (US); Craig Thompson Walters, Powell, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/668,007

(22) Filed: Feb. 9, 2022

(65) Prior Publication Data
US 2022/0161357 A1 May 26, 2022

Related U.S. Application Data

(63) Continuation of application No. 16/263,331, filed on Jan. 31, 2019, now Pat. No. 11,273,520.

(51) Int. Cl.
  *B23K 26/064* (2014.01)
  *B23K 26/14* (2014.01)
  *B23K 26/06* (2014.01)

(52) U.S. Cl.
  CPC ...... *B23K 26/0643* (2013.01); *B23K 26/0648* (2013.01); *B23K 26/1436* (2015.10); *B23K 26/1438* (2015.10)

(58) Field of Classification Search
  None
  See application file for complete search history.

(56) References Cited

U.S. PATENT DOCUMENTS

| 4,461,947 A | 7/1984 | Ward |
| 4,733,660 A | 3/1988 | Itzkan |
| 4,918,611 A | 4/1990 | Shyu |
| 5,120,926 A | 6/1992 | Marriott |

(Continued)

FOREIGN PATENT DOCUMENTS

| CN | 1241397 A | 1/2000 |
| CN | 1437038 A | 8/2003 |

(Continued)

OTHER PUBLICATIONS

Machine translation of JP-2002022089-A, Dec. 2022.*
Machine translation of JP-2003080389-A, Dec. 2022.*
Machine translation of WO-2006114446-A1, Dec. 2022.*

*Primary Examiner* — Geoffrey S Evans
(74) *Attorney, Agent, or Firm* — Fitch, Even, Tabin & Flannery LLP

(57) ABSTRACT

A system and method for automated laser ablation includes an end effector for performing laser ablation at a location with restricted access. The systems and methods of the present disclosure specifically provide for a miniature laser end effector which may be inserted through a port or bore in order to ablate the surface of an internal component of a complex assembly. In several embodiments of the present subject matter, the end effector is mounted on a machine and coupled to a laser system.

17 Claims, 6 Drawing Sheets

(56) References Cited

U.S. PATENT DOCUMENTS

| | | | |
|---|---|---|---|
| 5,367,142 A | 11/1994 | Gabzdyl | |
| 7,418,022 B2 | 8/2008 | Govorkov | |
| 8,265,117 B2 | 9/2012 | Govorkov | |
| 9,061,372 B2 | 6/2015 | Vogt | |
| 9,168,612 B2 | 10/2015 | Wilkiel | |
| 9,796,042 B2 | 10/2017 | Darzi | |
| 11,273,520 B2 | 3/2022 | Diwinsky | |
| 2001/0041228 A1 | 11/2001 | Ronge | |
| 2005/0224474 A1 | 10/2005 | Kilburn | |
| 2005/0226556 A1* | 10/2005 | Kinoshita | G02B 27/0933 385/37 |
| 2006/0096965 A1 | 5/2006 | Antoine | |
| 2007/0239032 A1 | 10/2007 | Milner | |
| 2013/0140286 A1 | 6/2013 | Roberts, III | |
| 2014/0332508 A1* | 11/2014 | Cilia | B23K 26/0652 219/121.64 |
| 2015/0076125 A1 | 3/2015 | Toyosawa | |
| 2015/0352666 A1 | 12/2015 | Fujita | |
| 2016/0368083 A1* | 12/2016 | Lowell | B23K 26/0624 |
| 2017/0252862 A1 | 9/2017 | Toyosawa | |
| 2017/0326685 A1 | 11/2017 | Kell | |
| 2018/0085860 A1 | 3/2018 | Krajca | |
| 2018/0169788 A1 | 6/2018 | Sonner | |

FOREIGN PATENT DOCUMENTS

| | | | | |
|---|---|---|---|---|
| CN | 101018639 B | | 4/2010 | |
| DE | 4212391 | | 10/1993 | |
| DE | 102007032231 | | 1/2009 | |
| DE | 102015109984 | | 12/2016 | |
| EP | 2711759 A1 | | 3/2014 | |
| EP | 3170612 A1 | | 5/2017 | |
| GB | 2202647 A | * | 9/1988 | ............ B23K 26/04 |
| GB | 2202647 A | | 9/1988 | |
| JP | 2002022089 A | * | 1/2002 | |
| JP | 2003080389 A | * | 3/2003 | |
| JP | 2012086235 | | 5/2012 | |
| JP | 2013184226 | | 9/2013 | |
| JP | 06179090 B2 | | 8/2017 | |
| WO | WO-2016122821 A2 | * | 8/2016 | ......... B23K 26/0624 |

* cited by examiner

SYSTEM AND METHOD FOR AUTOMATED LASER ABLATION

CROSS-REFERENCE TO RELATED APPLICATION(S)

This application is a continuation of U.S. application Ser. No. 16/263,331 filed Jan. 31, 2019, which is incorporated herein by reference in its entirety.

FIELD

The present subject matter relates generally to automated laser machining, and more particularly to systems and methods for performing laser ablation on a workpiece at a location with restricted access.

BACKGROUND

Generally, when a repair is required, it is desirable to access the internal components of a complex assembly without uninstalling and dismantling the assembly. For example, the inspection of a gas turbine engine may uncover a first engine component impinging a second engine component. In such a situation, it may be desirable to remove a portion of the first engine component to alleviate the impingement. However, access to the location in an assembled gas turbine engine may be limited to a small orifice (e.g., having a diameter less than 22 mm). Due to the relative inaccessibility of the repair location, such repairs are typically affected by removing the gas turbine engine from the aircraft and disassembling the engine to expose the component. The component may be repaired, and the engine reassembled and reinstalled, such that the engine may be used further.

In order to avoid the expensive and time-consuming process of engine removal and disassembly, removing material from a location with restricted access may rely upon laser ablation. Current approaches for employing a laser inside an assembled gas turbine engine may be based on mounting a fixed-beam laser on a borescope or other similar instrument. However, because a fixed-beam laser produces a stationary laser beam, this approach is not optimal for all laser ablation tasks in a difficult to access location.

Other current approaches for performing laser ablation may employ galvanometer (galvo) systems. A galvo system may be based on moving-mirror technology. In an exemplary galvo system, the movable mirrors are used to make small adjustments in mirror angles and move the stationary laser beam in different directions within a specific cutting or marking area. While galvo systems may be suitable for removing material from a component following disassembly, the physical dimensions of the system preclude using a galvo system within a complex assembly.

Accordingly, a system and method for repairing a component within a complex assembly, without necessarily requiring disassembly to access such component, would be beneficial.

BRIEF DESCRIPTION

Aspects and advantages of the invention will be set forth in part in the following description, or may be obvious from the description, or may be learned through practice of the invention.

In accordance with one embodiment of the present disclosure, and end effector for performing laser ablation is provided. The end effector may include an effector housing having a body extending lengthwise between a proximal end and a distal end opposite thereof. The body may define an aperture, and the proximal end may define a beam entry port to receive a laser beam into the effector housing. The end effector may include a dynamic beam diverter contained within the effector housing downstream of the proximal end and a focal lens coupled to a focal adjustment mechanism. The focal lens may be contained within the effector housing downstream of the dynamic beam diverter. The end effector may also include a mirror contained within the effector housing downstream of the focal lens. The beam entry port, the dynamic beam diverter, the focal lens, and the mirror may define a beam path within the effector housing. The mirror may be angled to direct the laser beam from the focal lens through the aperture.

In accordance with another embodiment of the present disclosure, a repair system for performing laser ablation on a workpiece is provided. The repair system may include an automated machine having a first controller and an end effector. The repair system may include a laser system having a second controller which may be operably coupled to the end effector at a beam entry port via a fiber-optic cable. The repair system may also include a pressurized gas source coupled to the end effector via a gas line and coupled to the first controller. The end effector may include an effector housing having a body extending lengthwise between a proximal end and a distal end opposite thereof. The body may define the beam entry port to receive a laser beam into the effector housing. The end effector may include a dynamic beam diverter contained within the effector housing downstream of the proximal end. The end effector may also include a focal lens coupled to a focal adjustment mechanism and contained within the effector housing downstream of the dynamic beam diverter and a mirror contained within the effector housing downstream of the focal lens. The beam entry port, the dynamic beam diverter, the focal lens, and the mirror may define a beam path within the effector housing. The mirror may be angled to direct the laser beam from the focal lens through the aperture.

In accordance with another embodiment of the present disclosure a method for performing laser ablation on a workpiece at a location with restricted access is provided. The method may include positioning an end effector at a working distance from the workpiece. The end effector may be coupled to an automated machine having a first controller and may include an effector housing having a body extending lengthwise between a proximal end and a distal end opposite thereof. The body may define an aperture, and the proximal end may define a beam entry port. The end effector may include a dynamic beam diverter contained within the effector housing downstream of the proximal end and a focal lens coupled to a focal adjustment mechanism contained within the effector housing downstream of the dynamic beam diverter. The end effector may also include a mirror contained within the effector housing downstream of the focal lens. The beam entry port, the dynamic beam diverter, the focal lens, and the mirror may define a beam path within the effector housing. The method may include activating a laser system to transmit a laser beam to the beam entry port of the end effector via a fiber-optic cable. The method may also include diverting the laser beam from an axial path by employing the dynamic beam diverter, focusing the laser beam, and directing the laser beam through the aperture onto the workpiece with the mirror.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
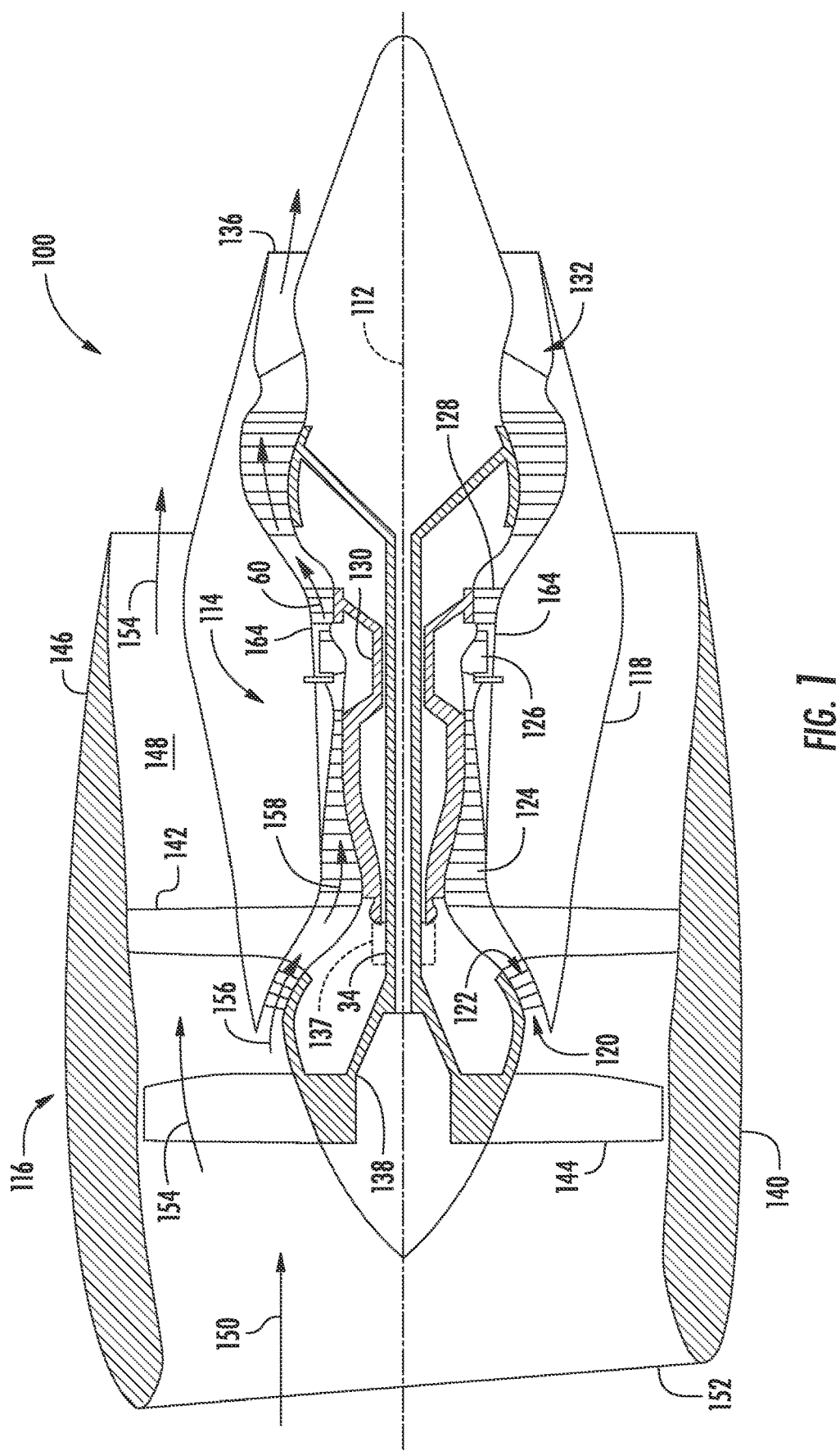
FIG. 1 illustrates a schematic cross-sectional view of an exemplary gas turbine engine according to various embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to the passage of a laser beam. For example, "upstream" refers to the direction from which the beam emits, and "downstream" refers to the direction to which the beam proceeds.

Systems and methods are generally provided for performing laser ablation on a workpiece at a location with restricted access. The location may, for example, be the surface of an internal component of an assembled gas turbine engine which may be accessed through a relatively small bore or port (e.g., with a diameter less than 22 mm). The systems and methods of the present disclosure specifically provide for a miniature laser end effector which may be inserted through a port or bore in order to ablate the surface of an internal component of a complex assembly. In several embodiments of the present subject matter, the end effector is mounted on an automated machine (e.g., a snake-arm robot) and coupled to a laser system. Once activated, the laser system transmits a laser beam through a fiber-optic cable to the end effector.

Upon entering the housing of the end effector in an exemplary repair system, the laser beam may pass through a collimating lens and then through a dynamic beam diverter, which diverts the laser beam from an axial path. In some embodiments, the dynamic beam diverter is a rotating wedge prism, also known as a "wedge window." Since the prism is rotating, the direction of deviation is rotating. This causes the laser beam to trace a corresponding arc, or circle, at a downstream location. The diameter of the circle is determined by the degree of deviation of the laser beam from the beam's original axial path, and the distance between the prism and the downstream location of the focusing lens and the focal length of the focusing lens.

After deviation from an axial path, the laser beam may proceed downstream of the dynamic beam diverter and though a lens. The laser beam may pass through the lens and continue downstream until the beam encounters a mirror. The mirror may direct the laser beam onto the workpiece. As the laser beam ablates the workpiece, a certain amount of debris may become airborne. Some embodiments protect the mirror from this debris by including a number of gas jet ports. The gas jet ports use compressed gas to direct the debris away from the area being ablated. The gas jet ports may also shield and provide cooling to the mirror.

Referring now to the drawings, FIG. 1 illustrates a cross-sectional view of one embodiment of a gas turbine engine 100 that may be utilized within an aircraft in accordance with aspects of the present subject matter, with the engine 100 being shown having a longitudinal or axial centerline axis 112 extending therethrough for reference purposes. The engine 100 will be discussed in detail below. Although shown as a turbofan jet engine, any suitable turbomachine can be utilized with the systems described herein. For example, suitable turbomachines include, but are not limited to, high-bypass turbofan engines, low-bypass turbofan engines, turbojet engines, turboprop engines, turboshaft engines, propfan engines, and so forth.

Figure 2:
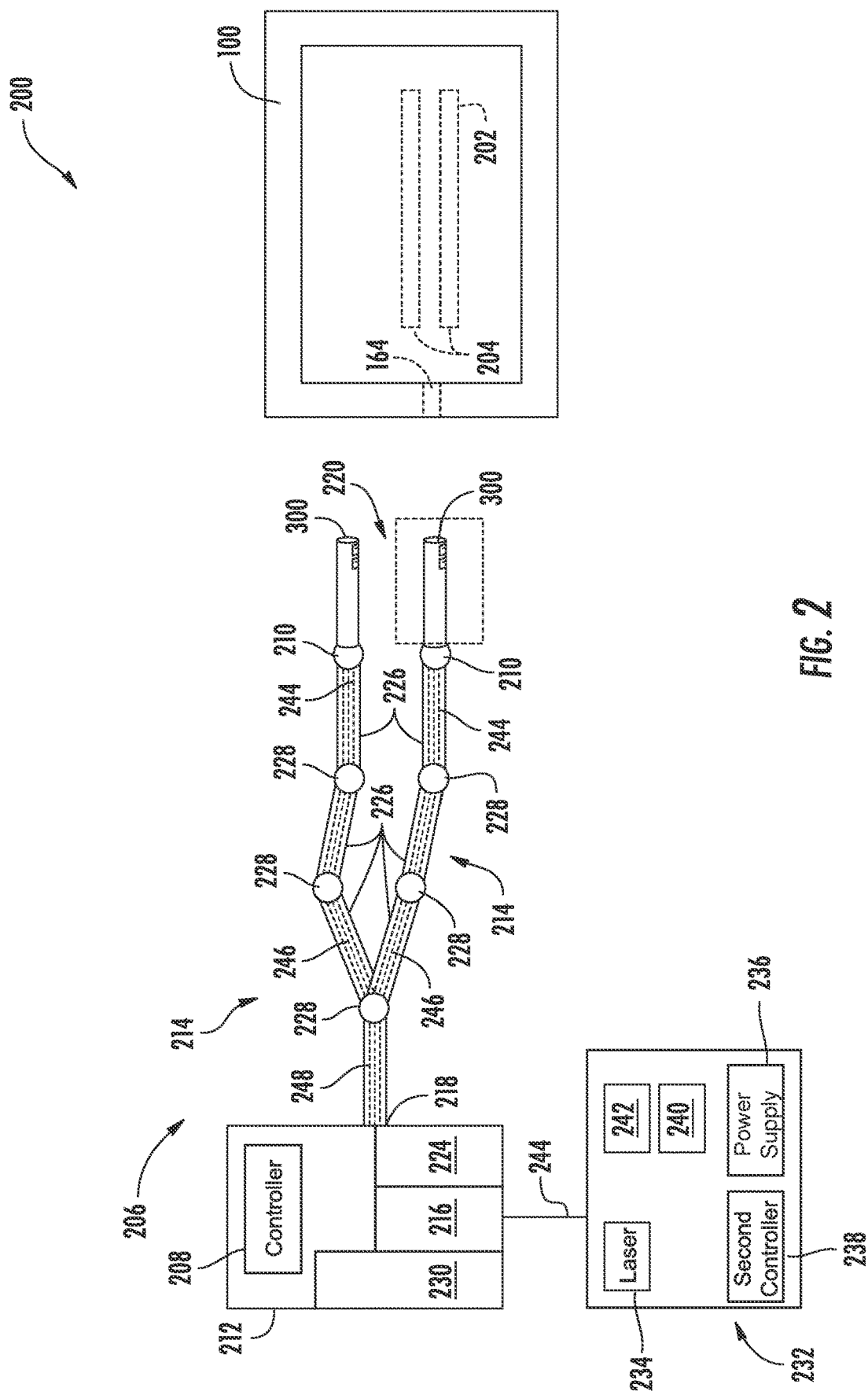
FIG. 2 shows a schematic view of an exemplary system for performing laser ablation on a workpiece at a location with restricted access.

FIG. 2 illustrates a schematic view of one embodiment of a repair system 200 for performing laser ablation on a workpiece 202 at a location with restricted access. The workpiece 202 may, in certain embodiments, be a component 204 of a gas turbine engine 100 which is accessible through an orifice (e.g., a bore or a port) 164. In some embodiments, the orifice 164 may have a diameter less than 22 mm. In the illustrated embodiment, the repair system 200 includes an automated machine 206 connected to a first controller 208. The automated machine 206 has an end effector 300 affixed to a movable component 210. The moveable component 210 orients the end effector 300 into a selected position to ablate the workpiece 202.

As depicted in FIG. 2, the repair system 200 relies on a laser system 232 to enable ablation operations. The laser system 232 may generally include a laser 234 coupled to a power supply 236 and to a second controller 238. The laser 234 produces a laser beam (FIG. 3, 302), which may be directed by beam steering devices 240 through beam shaping optics 242 and into a fiber-optic cable 244. The fiber-optic cable 244 may transmit (or transport) the laser beam from the laser system 232 to the end effector 300.

One ordinarily skilled in the art should appreciate that the laser 234 may be any type of laser capable of producing a laser beam of sufficient power, coherency, pulse width, pulse repetition time, and wavelength to be compatible with performing the desired machining operations upon the selected workpiece. For example, the laser 234 may be a solid state, $CO_2$, or fiber laser having a and average power of 10 Watts to 70 W (e.g., 20 W to 60 W). The laser 234 may be a repetitively pulsed laser with a pulse width of 75 ns to 175 ns (e.g., 100 ns to 150 ns). The laser 234 may have a peak power of 500 kW to 2 MW (e.g., 900 kW to 1.2 MW), and a wavelength of 300 nm to 11 μm (e.g., 400 nm to 2 μm). It should be appreciated that employing a laser 234 having insufficient power output may have no effect on the workpiece. At the same time, employing a laser 234 with too high a power output may result in an undesirable effect, such as excessive splatter, which may quickly contaminate the mirror 234, or damage the fiber-optic cable 244.

The laser 234 may emit a laser beam or pulses having a Gaussian profile distribution or spatial properties over a cross section, which are converted or reshaped to a laser beam or laser pulses having a top hat profile distribution or spatial properties over a cross-section. In such a top hat profile, the intensity of the beam is relatively constant across the cross section, such as diameter of the laser beam, unlike the intensity profile of the Gaussian beam. Accordingly, the edges of the shaped beam have approximately the same intensity as the center of the beam, providing reduced intensity drop off at the beam's edge. As those skilled in the art will appreciate, the optical components used in the laser system 232 are operably compatible with the laser source so as to avoid damaging those components during operation. For example, the particular fiber-optic cable 244 and its particular constituent materials may be selected based on the wavelength of the laser 234 and at certain wavelengths, transmission through the fiber-optic cable 244 may become impossible.

Figure 3:
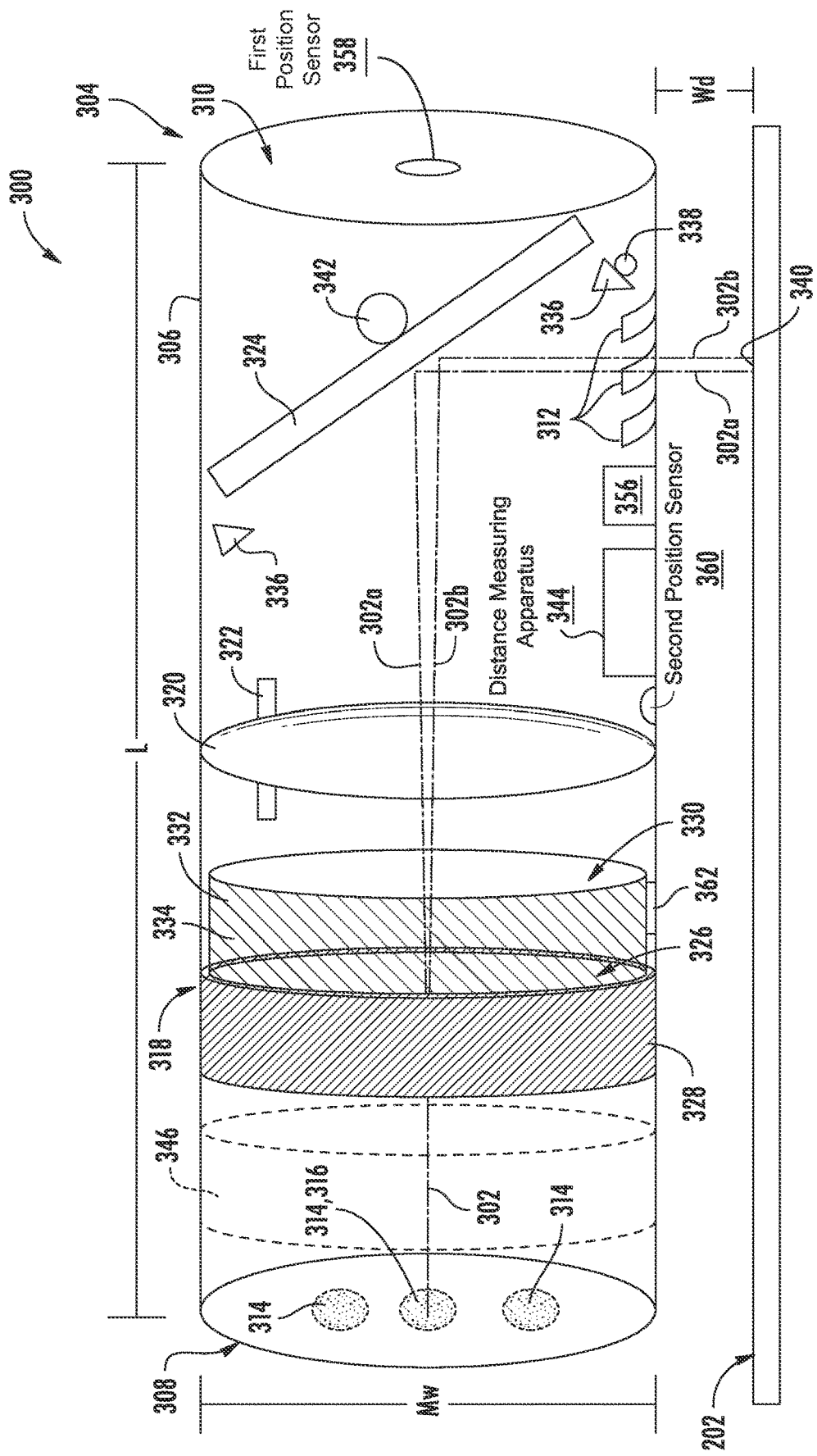
FIG. 3 shows a cross-section view of an exemplary end effector such as for use in the exemplary system of FIG. 2.

FIG. 3 illustrates a cross section view of an exemplary end effector 300 for use with one embodiment of the repair system 200. As depicted in FIG. 3, the end effector 300 has an effector housing 304, which includes a body 306. The body 306 extends lengthwise between a proximal end 308 and a distal end 310 opposite thereof. The effector housing 304 may have a length L of 25 mm to 75 mm (e.g., 55 mm to 65 mm) and a maximal width Mw of 10 mm to 21 mm (e.g., 15 mm to 20 mm). The body 306 defines at least one aperture 312, and the proximal end 308 defines at least one port 314, which may be a beam entry port 316. Although depicted in FIG. 3 as having a substantially tubular shape, it should be appreciated that the body 306 may be any suitable shape, such as rectangular, trapezoidal, pyramidal, spherical, or conical.

The beam entry port 316 depicted in FIG. 3 may be coupled to the fiber-optic cable 244 and oriented to receive the laser beam 302 into the effector housing 304. A dynamic beam diverter 318 may be secured in the effector housing downstream of the proximal end 308 and the beam entry port 316. The dynamic beam diverter 318 may cause the laser beam 302 to deviate from an axial path (FIG. 4, (A)). A focal lens 320 may be coupled to a focal adjustment mechanism 322 and contained within the effector housing 304 downstream of the dynamic beam diverter 318. The focal lens 320 may establish a desired beam radius downstream, on the surface of a mirror 324 contained within the effector housing 304. The mirror 324 may direct the laser beam 302 through the aperture 312 and onto the workpiece 202. In an exemplary embodiment, the beam entry port 316, the dynamic beam diverter 318, the focal lens 320, and the mirror 324 define a beam path within the effector housing 304. It should be appreciated that in an embodiment wherein the laser beam 302 is diverging upon delivery to the effector housing, a collimating lens may be secured within the effector housing upstream of the focal lens 320.

Figure 4:
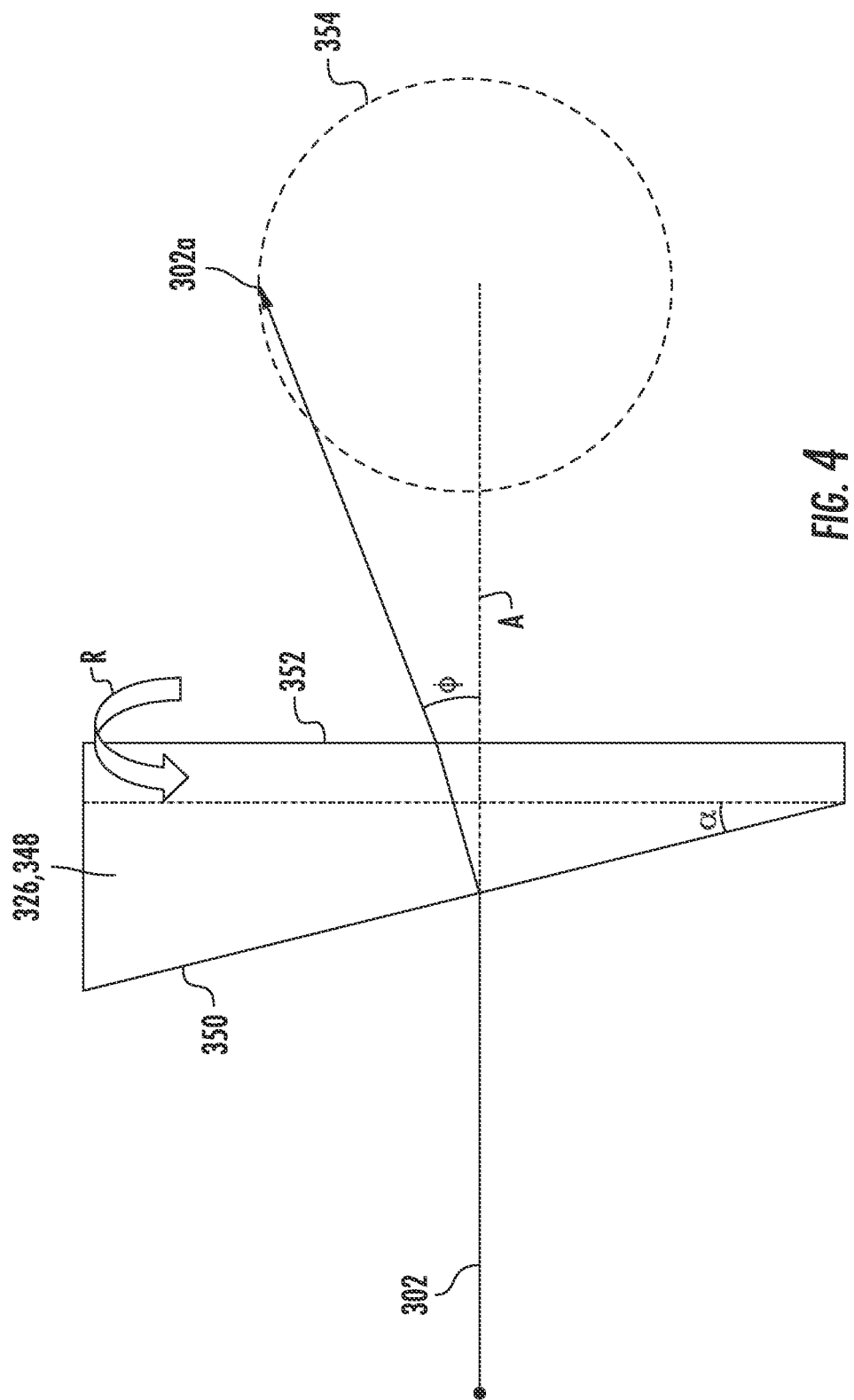
FIG. 4 depicts a cross-section view of an exemplary prism such as for use in the exemplary system of FIG. 2.

Still referring to FIG. 3 and referring to FIG. 4, the dynamic beam diverter 318 may be any laser optic that may be dynamically manipulated to cause the laser beam 302 to deviate from an axial path (A). For example, the dynamic beam diverter 318 may be a lens, window, prism, or mirror, and the dynamic beam diverter 318 may be oscillated, flexed, or rotated. In the embodiment depicted in FIG. 3, the dynamic beam diverter 318 includes a prism 326 held in a rotational bearing 328. The prism 326 may be a wedge prism 348 with a 1° to 20° (e.g., 3° to 19° angle α between a prism upstream surface 350 and a prism downstream surface 352. (For clarity, in FIG. 4, the angle α is depicted in reference to an imaginary line parallel to the prism downstream surface 352.) The wedge prism 348 deflects a beam normal to the prism's perpendicular surface through an angular deviation ϕ ranging from 2° to 10° (e.g., 5° to 10°). It should be appreciated that a wedge prism may also be referred to as a "wedge window."

Referring still to the dynamic beam diverter 318, a rotor 330 with a plurality of vanes 332 may be coupled to the rotational bearing 328. When a portion of compressed gas is directed across an outer surface 334 of the rotor 330, the vanes 332 convert the kinetic energy of the gas into a rotational moment. As a result, the rotor 330 spins the rotational bearing 328. For some embodiments, the rotor 330 may spin the rotational bearing 328 at a rotational speed of 9,000 rotations per minute (RPM) to 20,000 RPM (e.g., 9,500 RPM to 10,500 RPM). Some embodiments may include a rotational speed sensor 362 operably coupled to the dynamic beam diverter 318. The rotational speed sensor 362 may be a magnetic sensor, an optical sensor, a pressure sensor, or an acoustic sensor. The rotational sensor 362 may measure the rotational speed of the dynamic beam diverter 318. This information may be used by the operator to adjust the rotational speed of the dynamic beam diverter 318 to an optimal setting.

Because the laser beam 302 is diverted from an axial path (A), the rotation (R) causes the laser beam 302 to trace an arc at a downstream location. For example, as depicted in FIG. 3, the laser beam 302 may be in a first orientation 302a when the laser 232 is activated. As the prism 326 is rotated by the rotor 330, the laser beam 302 arcs through a second orientation 302b and back to the first orientation 302a. The laser beam 302 may continue tracing the arc (e.g., traces a circle 354), until either the laser beam 302 or the rotation are halted. It should be appreciated that while the first orientation 302a and the second orientation 302b are depicted, the laser beam 302 may pass through an infinite number of orientations as the laser beam 302 arcs through a circular trajectory.

In further embodiments of the repair system 200, the laser beam 302 may prescribe other, non-circular paths. The additional path profiles may be dictated by the manipulation of the dynamic beam diverter 318. For example, in an embodiment, the oscillation of the dynamic beam diverter 318 may cause the laser beam 302 to trace a linear path. In further embodiments, a second dynamic beam diverter 346 may be included and counter-rotated, causing the laser beam 302 to develop an epitrochoid. Additional displacement or directing of the laser beam 302 may also be achieved in some embodiments by movably coupling the mirror 324 to a mirror actuator 342 to move the mirror 324 between a first position and at least a second position.

As illustrated in FIG. 3, an exemplary embodiment of the end effector 300 may include a plurality of gas jet ports 336 contained within the effector housing 304. The plurality of gas jet ports 336 may be coupled to a gas line (FIG. 2, 248) and aligned with the aperture 312 so as to enable a gas jet to pass through or across the aperture 312. At least one gas jet port of the plurality of gas jet ports 336 may shield the mirror 324 from debris by directing a gas jet between the point of ablation 340 and the surface of the mirror 324. Additionally, a gas jet may be directed at the workpiece 202 to displace debris from the point of ablation 340. In some embodiments, the directing of the gas jet may be facilitated by moveably coupling a gas jet port 336 to a port actuator 338.

An additional embodiment in accordance with FIG. 3 may include a first position sensor 358 operably coupled to the distal end 310. A second position sensor 360 may be operably coupled to the body and have a field-of-view oriented in the direction of the workpiece 202. The first position sensor 358 and the second position sensor 360 may be used in the placement of the end effector in a proper position relative to the workpiece 202. The first position sensor 358 and the second position sensor 360 may be a camera with an illumination source, an ultrasonic sensor, or an optical sensor. In at least one embodiment, the second position sensor 360 may be a binocular sensor, which may provide three-axis information regarding the workpiece 202. It should be appreciated that in some embodiments, additional position sensors may be added to the end effector 300 to provide additional location information.

Still referring to FIG. 3, the end effector may include a distance measuring apparatus 344. The distance measuring apparatus 344 may be any suitable mechanical or electronic apparatus for determining a working distance Wd between the end effector 300 and workpiece 202. For example, a suitable mechanical distance measuring apparatus 344 may include a deployable rod, wire or other similar protrusion (not shown). Exemplary embodiments of the repair system 200 employing an electronic distance measuring apparatus 344 may include an ultrasonic or optical measuring device (not shown), such as an ultrasonic transducer or optical sensor.

In the various embodiments, the effectiveness of the machining operations will depend on a plurality of variables. These variables may include the rotational speed of the dynamic beam diverter 318, the position of the end effector 300, the working distance Wd, the settings of the laser system 232, conditions of the workpiece 202, and the positions of the various components of the beam path. The effectiveness of the machining operations may be determined by analyzing an emission plume from the point of ablation 340. In an exemplary embodiment, the laser beam 302 may be on an IR scale during delivery to the workpiece 202. Once the ablation is commenced, the work being completed may be detectable in the visible spectrum. This light may be projected back through the fiber-optic cable 244 and detected by a camera (not shown) or a spectral sensor (not shown). The intensity of the portions of the reflected light may be analyzed to determine the correct focus of the laser beam 302 on the workpiece 202, and, thus, the effectiveness of the machining operations.

Referring again to FIG. 2, in the embodiment shown, the automated machine 206 is a snake-arm robotic assembly. The exemplary snake-arm robotic assembly depicted generally includes a base 212, a robotic arm 214, and the moveable component 210. The base 212 generally includes an actuator pack 216 and the controller 208. The controller 208 is operably coupled to the actuator pack 216 for controlling the operation of the automated machine 206. Additionally, the controller 208 may be operably coupled to the moveable component 210 and/or one or more sensors (not shown) attached to or embedded in the robotic arm 214 and/or moveable component 210. Further, the robotic arm 214 extends generally between an arm root end 218 and an arm distal end 220. As will be explained in greater detail below, the robotic arm 214 includes an attachment section 224 at the root end 218, with the attachment section 224, for the embodiment depicted, attached to the actuator pack 216 of the base 212. Additionally, the robotic arm 214 includes the end effector 300 coupled to the moveable component 210 at a distal end 220. It should be appreciated that in some embodiments, the automated machine 206 may be equipped with more than one robotic arm 214 having an independent end effector 300. In such an exemplary embodiment, the addition multiple end effectors 300 may operate in tandem to accomplish the intended task.

Moreover, the robotic arm 214 of the exemplary automated machine 206 depicted is generally formed of a plurality of links 226 and a plurality of joints 228, with the plurality of links 226 sequentially arranged and movably coupled to one another with the plurality of joints 228. The plurality of links 226 are operable with the actuator pack 216, such that one or more actuators or motors (not shown) of the actuator pack 216 may control operation (such as a position and/or orientation) of the robotic arm 214. However, in other embodiments, any other suitable configuration may be provided for manipulating or otherwise controlling the plurality of links 226 of the robotic arm 214 of the exemplary automated machine 206.

Further, as is depicted, the base 212 includes one or more support structures 230 operable with the end effector 300 for assisting the end effector 300 in performing certain operations. For example, the one or more support structures 230 may include a pressurized gas source for the delivery of pressurized gas to the end effector 300 via a gas line 248. Also, when the end effector 300 is equipped to remove ablated material by suction, the one or more support structures 230 may include a suction apparatus operable coupled via suction line 246 to an intake 356 contained within the end effector 300.

In further embodiments, the automated machine 206 may be any other suitable form of automated machine. For example, the automated machine 206 may be an articulated arm, a cartesian robot, a scara robot, a cylindrical robot, a polar robot, or a delta robot.

Figure 6:
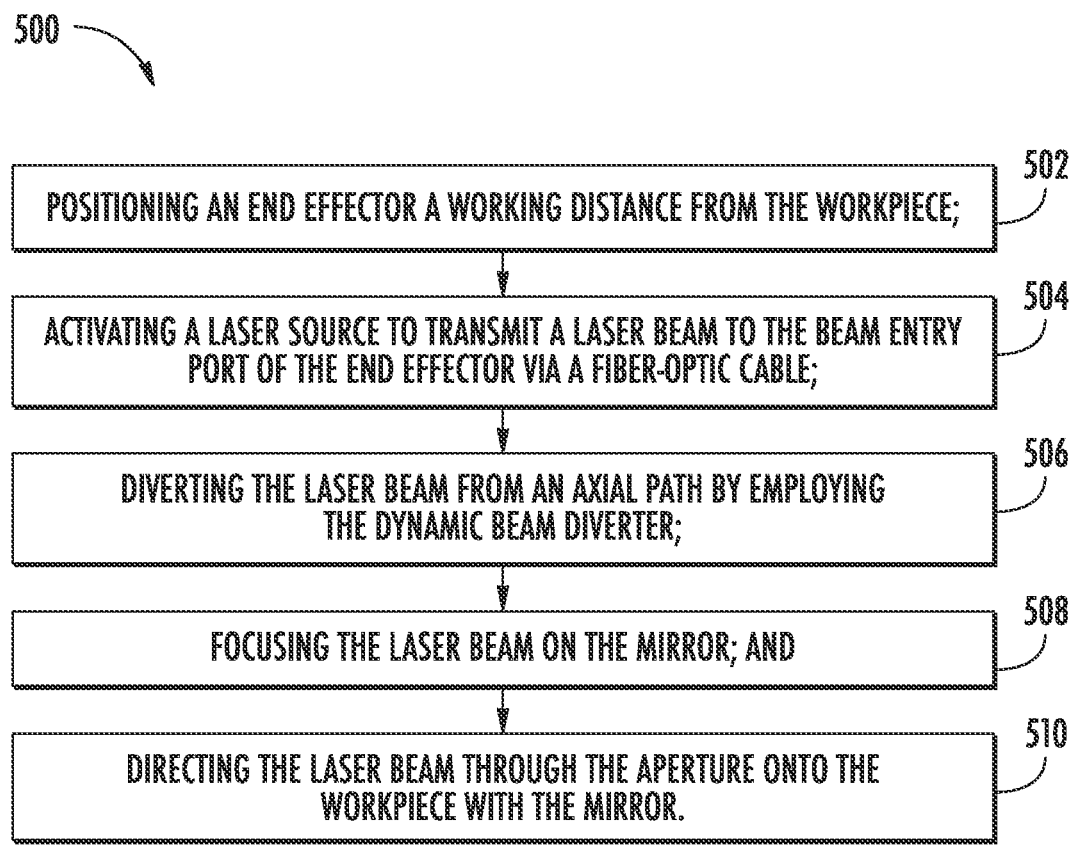
FIG. 6 provides a flow diagram for performing laser ablation on a workpiece at a location with restricted access.

Referring now to FIG. 6, a flow diagram of a method 500 for performing laser ablation on a workpiece at a location with restricted access is presented. The exemplary method 500 includes at 502, positioning an end effector a working distance from the workpiece. The end effector of 502 may be coupled to an automated machine. The automated machine may have a first controller. The end effector may include an effector housing with a body extending lengthwise between a proximal end and a distal end opposite thereof. The body defines an aperture, and the proximal end defines a beam entry port. A dynamic beam diverter may be contained within the effector housing downstream of the proximal end. The end effector may also include a focal lens coupled to a focal adjustment mechanism contained within the effector housing downstream of the dynamic beam diverter. A mirror may be contained within the effector housing downstream of the focal lens. The beam entry port, the dynamic beam diverter, the focal lens, and the mirror may define a beam path within the effector housing. The exemplary method 500 includes at 504, activating a laser system to transmit a laser beam to the beam entry port of the end effector via a fiber-optic cable, and at 506, diverting the laser beam from an axial path by employing the dynamic beam diverter. The exemplary method 500 includes at 508, focusing the laser beam, and at 510 directing the laser beam through the aperture 312 onto the workpiece with the mirror.

Referring again to FIG. 1, in general, the engine 100 may include a core gas turbine engine (indicated generally by reference character 114) and a fan section 116 positioned upstream thereof. The core engine 114 may generally include a substantially tubular outer casing 118 that defines an annular inlet 120. In addition, the outer casing 118 may further enclose and support a booster compressor 122 for increasing the pressure of the air that enters the core engine 114 to a first pressure level. A high-pressure, multi-stage, axial-flow compressor 124 may then receive the pressurized air from the booster compressor 122 and further increase the pressure of such air. The pressurized air exiting the high-pressure compressor 124 may then flow to a combustor 126 within which fuel is injected by a fuel system 162 into the flow of pressurized air, with the resulting mixture being combusted within the combustor 126. The high energy combustion products are directed from the combustor 126 along the hot gas path of the engine 100 to a first (high-pressure, HP) turbine 128 for driving the high-pressure compressor 124 via a first (high-pressure, HP) drive shaft 130, and then to a second (low-pressure, LP) turbine 132 for driving the booster compressor 122 and fan section 116 via a second (low-pressure, LP) drive shaft 134 that is generally coaxial with first drive shaft 130. After driving each of turbines 128 and 132, the combustion products may be expelled from the core engine 114 via an exhaust nozzle 136 to provide propulsive jet thrust.

It should be appreciated that each turbine 128, 130 may generally include one or more turbine stages, with each stage including a turbine nozzle and a downstream turbine rotor. As will be described below, the turbine nozzle may include a plurality of vanes disposed in an annular array about the centerline axis 112 of the engine 100 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 130 or 134).

Additionally, as shown in FIG. 1, the fan section 116 of the engine 100 may generally include a rotatable, axial-flow fan rotor 138 that configured to be surrounded by an annular fan casing 140. In particular embodiments, the (LP) drive shaft 134 may be connected directly to the fan rotor 138 such as in a direct-drive configuration. In alternative configurations, the (LP) drive shaft 134 may be connected to the fan rotor 138 via a speed reduction device 137 such as a reduction gear gearbox in an indirect-drive or geared-drive configuration. Such speed reduction devices may be included between any suitable shafts/spools within engine 100 as desired or required.

It should be appreciated by those of ordinary skill in the art that the fan casing 140 may be configured to be supported relative to the core engine 114 by a plurality of substantially radially-extending, circumferentially-spaced outlet guide vanes 142. As such, the fan casing 140 may enclose the fan rotor 138 band its corresponding fan rotor blades 144. Moreover, a downstream section 146 of the fan casing 140 may extend over an outer portion of the core engine 114 so as to define a secondary, or by-pass, airflow conduit 148 that provides additional propulsive jet thrust.

During operation of the engine 100, it should be appreciated that an initial air flow (indicated by arrow 150) may enter the engine 100 through an associated inlet 152 of the fan casing 140. The air flow 150 then passes through the fan blades 144 and splits into a first compressed air flow (indicated by arrow 154) that moves through conduit 148 and a second compressed air flow (indicated by arrow 156) which enters the booster compressor 122. The pressure of the second compressed air flow 156 is then increased and enters the high-pressure compressor 124 (as indicated by arrow 158). After mixing with fuel and being combusted within the combustor 126, the combustion products 160 exit the combustor 126 and flow through the first turbine 128. Thereafter, the combustion products 160 flow through the second turbine 132 and exit the exhaust nozzle 136 to provide thrust for the engine 100.

Figure 5:
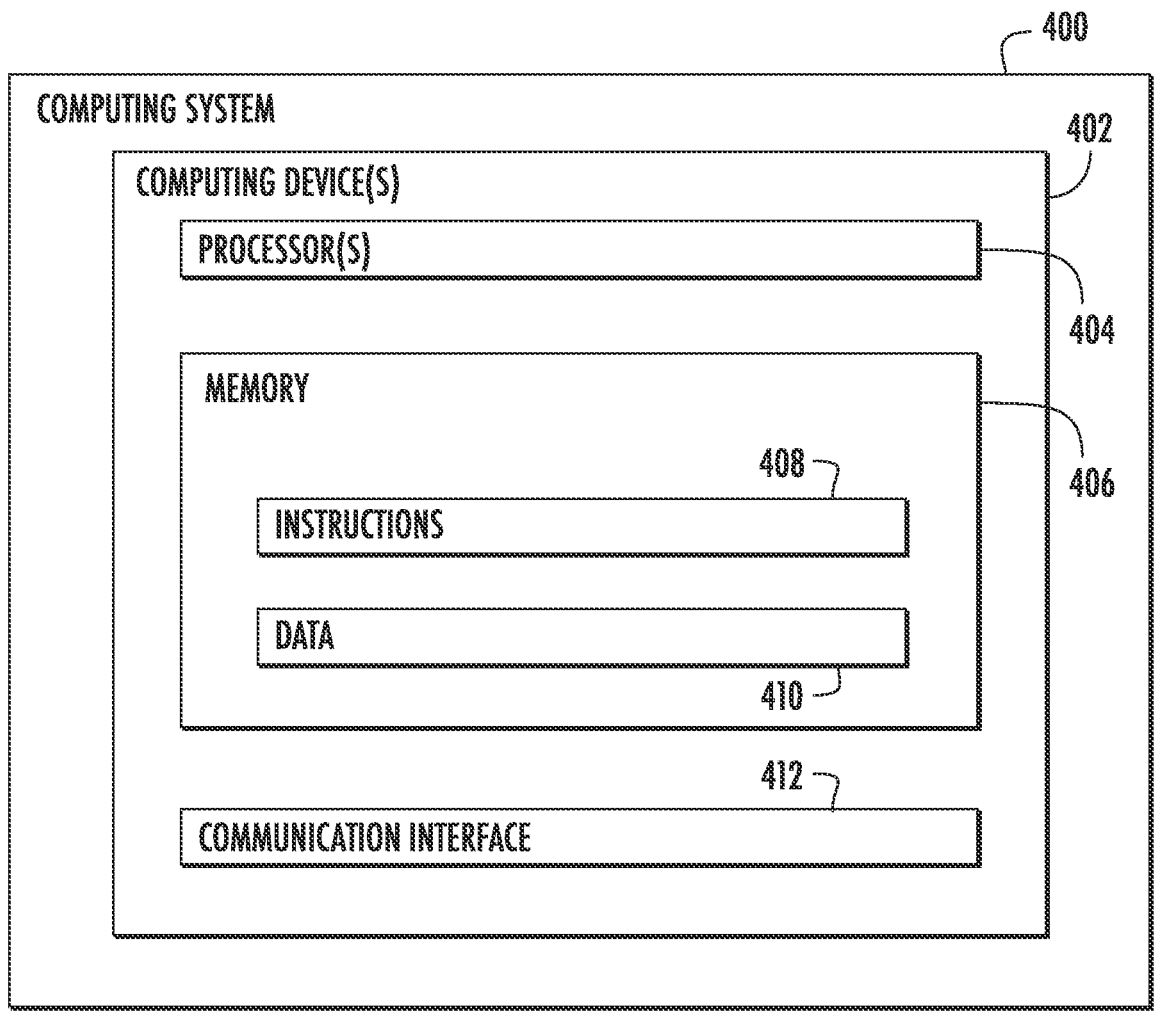
FIG. 5 depicts an exemplary controller such as for use in the exemplary systems of FIG. 2.

FIG. 5 provides a block diagram of an example computing system 400 that is representative of an embodiment of controller 208, 238 that may be used to implement the methods and systems described herein according to exemplary embodiments of the present subject matter. Though described below as a computing system, it should be appreciated that in some embodiments, the controller may be an analog system or an electrical system that does not include a computing device. As shown, the computing system 400 may include one or more computing device(s) 402. The one or more computing device(s) 402 may include one or more processor(s) 404 and one or more memory device(s) 406. The one or more processor(s) 404 may include any suitable processing device, such as a microprocessor, microcontroller, integrated circuit, logic device, or other suitable processing device. The one or more memory device(s) 406 may include one or more computer-readable media, including, but not limited to, non-transitory computer-readable media, RAM, ROM, hard drives, flash drives, or other memory devices.

The one or more memory device(s) 406 may store information accessible by the one or more processor(s) 404, including computer-readable instructions 408 that may be executed by the one or more processor(s) 404. The instructions 408 may be any set of instructions that when executed by the one or more processor(s) 404, cause the one or more processor(s) 404 to perform operations. The instructions 408 may be software written in any suitable programming language or may be implemented in hardware. In some embodiments, the instructions 408 may be executed by the one or more processor(s) 404 to cause the one or more processor(s) 404 to perform the processes for performing laser ablation on a workpiece at a location with restricted access, or for implementing any of the other processes described herein.

The memory device(s) 404 may further store data 410 that may be accessed by the processor(s) 404. For example, the data 410 may include end effector location, working distance, rotation speed, or ablation progress as described herein. The data 410 may include one or more table(s), function(s), algorithm(s), model(s), equation(s), etc. according to example embodiments of the present subject matter.

The one or more computing device(s) 402 may also include a communication interface 412 used to communicate, for example, with the other components of system. The communication interface 412 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A repair system for directing laser energy to a workpiece, the repair system comprising:
    a machine having an end effector;
    a laser system coupled to the end effector;
    wherein the end effector comprises:
       an effector housing having a body extending lengthwise between a proximal end and a distal end opposite thereof, wherein the body receives a laser beam,
       a dynamic beam diverter contained within the effector housing,
       a focal lens to direct the laser beam, and
       a mirror contained within the effector housing, and wherein the mirror is angled to direct the laser beam through an aperture in the effector housing; and
    a pressurized gas source coupled to the end effector via a gas line and coupled to a first controller, wherein a plurality of vanes are oriented to convert an energy from a portion of a pressurized gas into a rotational speed of 9,000 rotations per minute to 20,000 rotations per minute to rotate a rotor.

2. The repair system of claim 1, wherein the mirror is movably coupled to the effector housing, and wherein the end effector further comprises a mirror actuator coupled to the mirror to move the mirror between a first position and at least a second position.

3. The repair system of claim 1, wherein the dynamic beam diverter comprises:
    a lens held in a rotational bearing; and
    the rotor coupled to the rotational bearing.

4. The repair system of claim 1, wherein the effector housing further defines the aperture, the repair system further comprising:
    a plurality of gas jet ports contained within the effector housing, coupled to the gas line, and aligned with the aperture, wherein an at least one gas jet port of the plurality of gas jet ports is oriented to shield the mirror with a gas jet.

5. The repair system of claim 4, further comprising:
    a port actuator coupled to the at least one gas jet port of the plurality of gas jet ports, wherein the port actuator directs a flow of the gas jet.

6. The repair system of claim 4, further comprising:
    a suction apparatus coupled to the end effector via a suction line and coupled to the first controller; and
    an intake operably coupled to the aperture and the suction line.

7. The repair system of claim 1, wherein the laser system further comprises a second controller, wherein the laser beam has a peak power range of 500 kW to 2 MW.

8. The repair system of claim 1, wherein the end effector further comprises a distance measuring apparatus coupled to the end effector and orientated to determine a working distance between the effector housing and the workpiece.

9. The repair system of claim 1, wherein the end effector is a first end effector, the repair system further comprising a second end effector configured to operate in tandem with the first end effector.

10. A method for directing laser energy to a workpiece at a location with restricted access, the method comprising:
    positioning an end effector a working distance from the workpiece, the end effector being coupled to a machine having, the end effector comprising:
       an effector housing having a body extending lengthwise between a proximal end and a distal end opposite thereof, wherein the body receives a laser beam,
       a dynamic beam diverter contained within the effector housing, and
       a focal lens contained within the effector housing,
    activating a laser system to transmit the laser beam to the body of the end effector, wherein the laser system is operably coupled to the end effector;
    diverting the laser beam from an axial path by employing the dynamic beam diverter;
    focusing the laser beam; and
    directing the laser beam onto the workpiece using the focal lens,
       wherein the end effector is a first end effector, and wherein a second end effector operates in tandem with the first end effector.

11. The method of claim 10, wherein the end effector further comprises a mirror contained within the effector housing.

12. The method of claim 11, wherein the mirror is movably coupled to the effector housing, and wherein the end effector further comprises a mirror actuator coupled to the mirror to move the mirror between a first position and at least a second position.

13. The method of claim 12, further comprising:
    coupling a pressurized gas source to the end effector via a gas line and to a first controller; and
       orienting a plurality of vanes such that an energy from a portion of a pressurized gas is converted into a rotational speed of 9,000 rotations per minute to 20,000 rotations per minute to rotate a rotor.

14. The method of claim 11, wherein the dynamic beam diverter comprises:
    a lens held in a rotational bearing; and
    a rotor coupled to the rotational bearing.

15. The method of claim 10, wherein the effector housing has a maximal width of 10 mm to 21 mm and a length of 25 mm to 75 mm.

16. The method of claim 10, wherein the laser system further comprises a second controller, wherein the laser beam has a peak power range of 500 kW to 2 MW.

17. A repair system for directing laser energy to a workpiece, the system comprising:
    a machine having an end effector; and
    a laser system coupled to the end effector;
    wherein the end effector comprises:

an effector housing having a body extending lengthwise between a proximal end and a distal end opposite thereof, wherein the body receives a laser beam,
a dynamic beam diverter contained within the effector housing,
a focal lens to direct the laser beam, and
wherein the end effector is a first end effector, the repair system further comprising a second end effector configured to operate in tandem with the first end effector.

* * * * *